United States Patent
Beerling et al.

(10) Patent No.: US 9,689,725 B2
(45) Date of Patent: Jun. 27, 2017

(54) MAGNETIC-INDUCTIVE FLOWMETER HAVING A CENTRAL FLAT MEASURING TUBE PORTION WITH SUPPORT RIBS

(71) Applicant: Krohne AG, Basel (CH)

(72) Inventors: Freek Beerling, Breda (NL); Alexander Marnix Heijnsdijk, Papendrecht (NL); Josef Neven, Mours St. Eusebe (FR); Christian Nicolas, Chatuzange le Goubet (FR)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 14/963,610

(22) Filed: Dec. 9, 2015

(65) Prior Publication Data
US 2016/0202097 A1 Jul. 14, 2016

(30) Foreign Application Priority Data

Jan. 14, 2015 (DE) .......................... 10 2015 000 110
Oct. 1, 2015 (DE) .......................... 10 2015 116 679

(51) Int. Cl.
  *G01F 1/58* (2006.01)
  *G01F 15/14* (2006.01)
(52) U.S. Cl.
  CPC .............. *G01F 1/584* (2013.01); *G01F 1/586* (2013.01); *G01F 15/14* (2013.01)
(58) Field of Classification Search
  None
  See application file for complete search history.

(56) References Cited

U.S. PATENT DOCUMENTS

| | | | |
|---|---|---|---|
| 4,195,515 A | 4/1980 | Smoll | |
| 5,325,728 A | 7/1994 | Zimmerman et al. | |
| 5,503,026 A * | 4/1996 | Bohm | G01F 1/002 73/861.11 |
| 6,092,428 A | 7/2000 | Brockhaus | |
| 6,237,424 B1 * | 5/2001 | Salmasi | G01F 1/002 73/861.11 |
| 6,453,754 B1 | 9/2002 | Florin | |
| 6,564,612 B2 | 5/2003 | Brockhaus | |
| 6,804,613 B2 | 10/2004 | Ishikawa et al. | |
| 7,971,493 B2 | 7/2011 | Hencken et al. | |
| 8,006,569 B2 | 8/2011 | Gögge et al. | |
| 8,286,502 B2 | 10/2012 | Pelayo | |
| 2005/0199073 A1 * | 9/2005 | Keech | G01F 1/588 73/861.12 |
| 2007/0137311 A1 * | 6/2007 | Poortmann | G01F 1/586 73/861.08 |

(Continued)

FOREIGN PATENT DOCUMENTS

| | | |
|---|---|---|
| DE | 692 32 633 T2 | 9/2002 |
| EP | 0 704 682 A2 | 4/1996 |

*Primary Examiner* — Harshad R Patel
(74) *Attorney, Agent, or Firm* — David S. Safran

(57) ABSTRACT

The invention relates to a magnetic-inductive flowmeter having a measuring tube (1), a magnetic field generator (2) and a measuring electrode (3). Thereby, the measuring tube (1) has a measuring section (4) that is flat on one side having a planar measuring tube portion, called portion (5) in the following, and the magnetic field generator (2) has a pole shoe (7). A flowmeter that allows a high measuring accuracy, even under high pressure loads is achieved in that a support rib (9) is implemented on the planar measuring tube portion (5).

7 Claims, 2 Drawing Sheets

(56) References Cited

U.S. PATENT DOCUMENTS

| | | | |
|---|---|---|---|
| 2008/0060446 A1* | 3/2008 | Lincoln | G01F 1/586 73/861.12 |
| 2008/0060447 A1* | 3/2008 | Lincoln | G01F 1/586 73/861.12 |
| 2010/0126282 A1* | 5/2010 | Neuburger | G01F 15/14 73/861.12 |
| 2010/0132478 A1* | 6/2010 | Pelayo | G01F 15/14 73/861.12 |
| 2012/0017698 A1* | 1/2012 | Neuburger | G01F 1/584 73/861.12 |
| 2012/0066301 A1 | 3/2012 | Holland | |
| 2012/0304780 A1* | 12/2012 | Walbrecker | G01F 1/58 73/861.12 |
| 2013/0145861 A1* | 6/2013 | Neven | G01F 1/584 73/861.12 |
| 2014/0020477 A1* | 1/2014 | van Willingen | G01F 1/588 73/861.12 |
| 2014/0053658 A1* | 2/2014 | Neven | G01F 1/588 73/861.12 |
| 2015/0300861 A1 | 10/2015 | Regen et al. | |

* cited by examiner

MAGNETIC-INDUCTIVE FLOWMETER HAVING A CENTRAL FLAT MEASURING TUBE PORTION WITH SUPPORT RIBS

BACKGROUND OF THE INVENTION

Field of the Invention

The invention relates to a magnetic-inductive flowmeter for measuring flow of a flowing medium, having a measuring tube, having a magnetic field generator for generating a magnetic field at least partially interfusing the measuring tube, having at least one measuring electrode for tapping a measuring voltage induced in the flowing medium, wherein the measuring tube has a central measuring section including the measuring electrodes that is flat on one side having a planar measuring tube portion, called portion in the following, and at least one coil core and one pole shoe belong to the magnetic field generator.

Description of Related Art

According to Faraday's law of induction, an electric field strength is formed perpendicular to the direction of flow of the medium and perpendicular to the magnetic field in a flowing, electrically conductive medium interfused by a magnetic field. Faraday's law of induction is thus exploited in magnetic-inductive flowmeters in that a magnetic field usually fluctuating over time during the measurement process is generated by means of a magnetic field generator usually having at least one magnetic field coil, one coil core as well as one pole shoe and that the magnetic field at least partially interfuses the electrically conductive medium flowing through the measuring tube. Here, the generated magnetic field has at least one component perpendicular to the longitudinal axis of the measuring tube or perpendicular to the direction of flow of the medium.

At least one measuring electrode for tapping a measuring voltage induced in a flowing medium belongs to the magnetic-inductive flowmeter being discussed here. Often, two measuring electrodes are present. Preferably, the measuring electrodes come into contact with the medium and the virtual connection line of the two measuring electrodes runs at least essentially perpendicular to the direction of the magnetic field interfusing the measuring tube perpendicular to the longitudinal axis of the measuring tube.

It has already been described above that the measuring electrodes are, in particular, such that they come into contact with the medium, i.e., tapping the measuring voltage while galvanically in contact with the medium. However, there are magnetic-inductive flowmeters in which the measuring voltage is capacitively tapped.

Magnetic-inductive flowmeters known from the prior art in German Patent DE 692 32 633 C2, German Patent Application DE 199 07 864 A1 and corresponding U.S. Pat. No. 6,453,754 B1, German Patent Application DE 100 64 738 B4 and corresponding U.S. Pat. No. 6,564,612 B2, German Patent Application DE 102 43 748 A1 and corresponding U.S. Pat. No. 6,804,613 B2, German Patent Application DE 10 2008 005 258 A1 and corresponding U.S. Pat. No. 7,971,493 B2 and German Patent Application DE 10 2011 112 703 A1 and corresponding U.S. Patent Application Publication 2012/0066301 A1 as well as European Patent Application EP 0 704 682 A1 and European Patent Application EP 0 834 057 A1 and corresponding U.S. Pat. No. 6,092,428 are referred to as examples. Reference is made, in particular, to German Patent Application DE 10 2008 057 756 A1 and corresponding U.S. Pat. No. 8,286,502 B2, from which the magnetic-inductive flowmeter described in the introduction is known. The measuring tube in this known magnetic-inductive flowmeter has a changing cross-section over its length and the cross-section in the central section of the measuring tube, called measuring section above, is less than at the beginning of the measuring tube and the end of the measuring tube. Thereby, the cross-section of the measuring tube in its central section, i.e., in the measuring section, is rectangular, or optionally square. On the other hand, the invention is based on a magnetic-inductive flowmeter, in which the measuring section of the measuring tube necessarily has at least one planar measuring tube portion, called portion above. The measuring section can have two or more planar portions.

The known magnetic-inductive flowmeters are often a "sturdy construction" in that the measuring tube consists of metal. As a general rule, these measuring tubes are tubes, i.e., cylindrical hollow bodies having a circular cross section. Further, it holds true for most magnetic-inductive flowmeters that the measuring device housings have end flanges and connection flanges consisting of metal on both sides. On the one hand, these flanges, with which the two ends of the measuring tube are—directly or indirectly—connected, terminate the flowmeter, leading to the term "end flange". On the other hand, the flanges are used for connection of both sides of the flowmeter to the corresponding piping flanges, thus "connection flange".

Magnetic-inductive flowmeters have to meet substantial requirements for measuring accuracy. It is to be taken into consideration here that the measuring voltage induced in the flowing, electrically conductive medium is relatively low. This holds true for "normal conditions", which should be understood as a flow velocity that is not particularly low and a conductivity of the flowing medium that is not particularly low. In the case of "complicated conditions" in terms of measuring, i.e., low flow velocity or low electric conductivity of the flowing medium, particularly low measuring voltages are induced, with the consequence that relatively low—in absolute terms—interfering voltages significantly influence the measuring accuracy.

For this reason, the magnetic field generator should generate a relatively strong and largely homogenous magnetic field in the measuring tube. This takes place in particular in that the measuring tube should only be relatively thin in the measuring section.

In an implementation of the magnetic-inductive flowmeter known from German Patent Application DE 10 2008 057 756 A1 and corresponding U.S. Pat. No. 8,286,502 B2, the wall thickness of the measuring tube in the measuring section is less than at the beginning and the end of the measuring tube. In order to guarantee a certain capacity of the measuring tube to withstand pressure, even in the measuring section, at least one reinforcement connecting the measuring tube to the measuring device housing is provided in the central section of the measuring tube, i.e., in the area of the measuring section.

Instead of a measuring tube of metal, it can be appropriate to produce the measuring tube of a material that is relatively less durable—and thus less expensive—in particular, of relatively inexpensive plastic. Such a material requires that its relatively low ability to withstand stress has to be accordingly compensated. On the other hand, however, it is possible that even in the case of metallic measuring tubes, such high pressure arises that the required stability needs to be ensured.

In order to generate the above described strong and homogenous magnetic field, it is further provided to create at least one flat and planar measuring tube portion, called portion in the following, in the measuring section and to arrange the pole shoe of the magnetic field generator next to and flat against the planar portion and thus close to the inside of the measuring tube.

SUMMARY OF THE INVENTION

The primary object of the invention is to provide a magnetic-inductive flowmeter that allows a high measuring accuracy, even under a high pressure load.

The magnetic-inductive flowmeter according to the invention in which the above derived and described object is achieved is initially and essentially wherein at least one support rib is implemented on the measuring tube portion, called portion in the following.

In particular, several support ribs are provided that are possibly also designed as one piece as a support structure.

If the portion is designed to be relatively thin in magnetic-inductive flowmeters, then it cannot be prevented without further measures—at a correspondingly high pressure in the measuring tube—that the portion buckles outwardly. This would unintentionally and unwantedly change the position and alignment of the pole shoe sitting on the portion. The support ribs present in the invention lead to a stabilization or stiffening of the portion, counteracting the buckling.

Thereby, the support ribs are fixed, in particular, only on or to the portion.

In a particularly preferred implementation of the magnetic-inductive flowmeter according to the invention, the pole shoe consists of several pole shoe parts. In implementations, this allows for the possibility of arranging the pole shoe parts between the support ribs in that recesses for the support ribs are located between the pole shoe parts. In this particularly preferred implementation, thus, the support ribs provided on the portion do not prevent the pole shoe parts from lying flat against the other portions. At the same time, the pole shoe parts are supported on the support ribs.

If the pole shoe is made of several parts in the preferred implementations of magnetic-inductive flowmeters according to the invention, then a particularly preferred implementation is further wherein the pole shoe parts are connected to the coil core via pole shoe bridges having good magnetic conductivity. Preferably, this implementation is additionally wherein the pole shoe parts, the pole shoe bridges and the coil core are designed as one piece. This, then, has the advantage that the magnetic flux generated by the magnetic coil magnetically influences the pole shoes with minimum magnetic resistance, so that at a given magnetic flux through the magnetic coil and through the current feed of the magnetic coil, a relatively strong magnetic field can interfuse the measuring tube. Alternatively, the pole shoe parts, the pole shoe bridges and the coil core are grouped into subgroups that are designed as one piece. Thus, for example, the pole shoe parts and the pole shoe bridges are designed as one piece and the coil core is a separate component. This also holds true for other subgroupings.

In the last-described implementation, in which the pole shoe parts, the pole shoe bridges and the coil core are designed as one piece, it is recommended to produce the entirety of coil core, pole shoe bridges and pole shoe parts using the MIM method (MIM=metal inspection molding). If not all elements (i.e., pole shoe parts, pole shoe bridges and coil core) are designed as one piece, then, in one design, the coil core and/or the pole shoe bridge and/or the pole shoe parts are produced using the MIM method.

One implementation is wherein the pole shoe parts are arranged essentially in a plane parallel to the portion. In one variation, the pole shoe parts lie directly on the portion.

Furthermore, the coil core in one design is located essentially centrally inside the portion. Also, one end of the coil core facing the portion is located above the pole shoe parts and thus also above the portion. If, in this implementation, in particular, coil bridges are present, then these extend from the plane of the pole shoe parts to—due to the proximity of the portion—the lower end of the coil core.

In one implementation, four pole shoe parts are present. In an additional or alternative design, the pole shoe parts each have an essentially rectangular outer contour. The four pole shoe parts are, in one variation, in particular arranged relative to the portion so that they, in turn, entirely cover a rectangular surface.

In one design, the support ribs form a cross on the portion, wherein, in particular in one variation, the overlapping area of the support ribs lies essentially in the center of the portion. In an alternative design, at least two support ribs are arranged parallel to one another. In a further design, the support ribs are arranged in a rhombus shape.

As described in detail above, there are various possibilities for designing and further developing the magnetic-inductive flowmeter according to the invention as will be apparent from the following description in conjunction with the accompanying drawings.

DETAILED DESCRIPTION OF THE INVENTION

Figure 1:
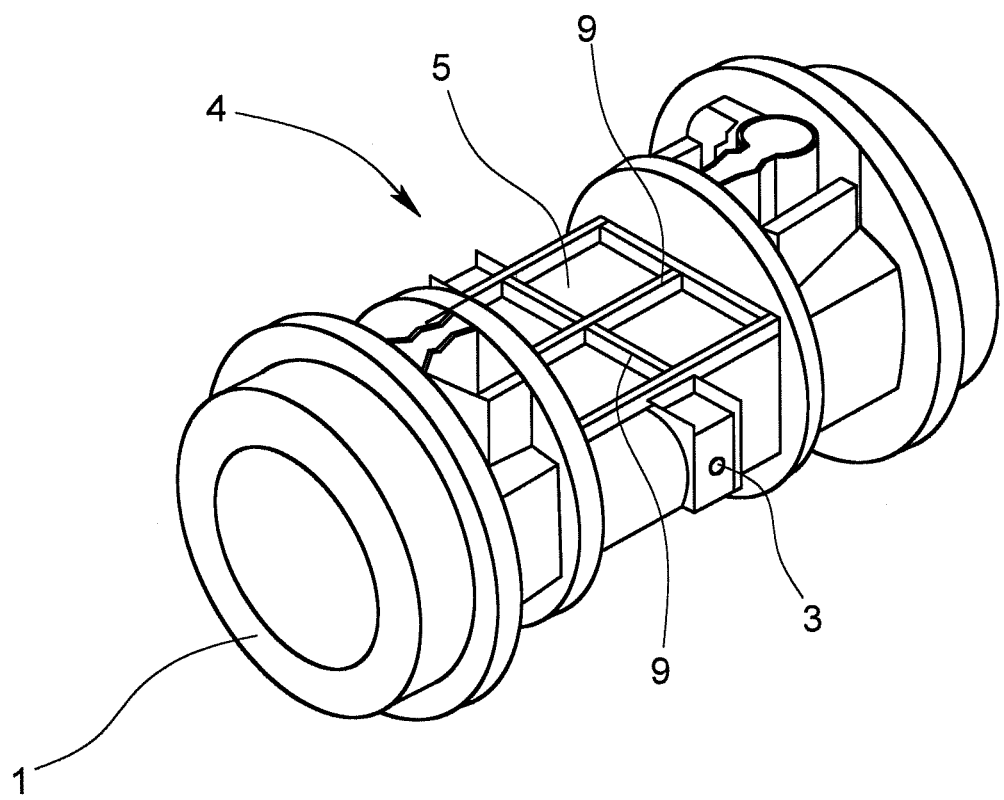
FIG. 1 is a perspective view of a measuring tube of a magnetic-inductive flowmeter in accordance with the invention.
Figure 2:
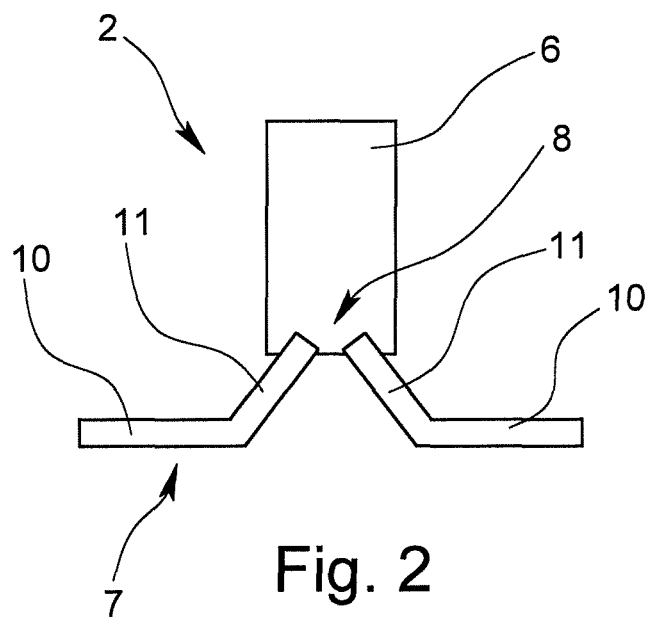
FIG. 2 is a first view illustrating a preferred embodiment of a magnetic-inductive flowmeter.

FIG. 1 shows a magnetic-inductive flowmeter having a measuring tube 1 with a medium flowing through it, whose flow is to be measured, a magnetic field generator 2, only shown in part in FIG. 2, for generating a magnetic field at least partially interfusing the measuring tube 1, and at least one measuring electrode 3 for tapping a measuring voltage induced in the flowing medium. Generally—not shown—but present, is an evaluation unit and a measuring device housing.

In the magnetic-inductive flowmeters according to the invention, the measuring tube 1 has a central measuring section 4, which is flat on one side and includes the measuring electrodes 3, having a planar measuring tube portion, always called portion 5 in the following. The magnetic field generator 2, as is customary, has a magnetic coil (not shown), a coil core 6 and at least one pole shoe 7. In the mounted state, the pole shoe 7 is located centrally on the portion 5 and, thereby, in particular, above the area in which the two support ribs 9 meet as bars of a cross.

If the measuring tube 1 consists of plastic or if very high pressures arise in the measuring tube then, taking the pressure that can prevail in the measuring tube 1 into consideration, the measuring tube 1, even in the measuring section 4, needs to have a certain pressure resistance. For this reason, the different sections of the measuring tube 1 are relatively thick. This, however, does not hold true, for reasons stated above, for the portion 5. This is relatively thin.

For stability, support ribs 9 are implemented on the portion 5, which are used for supporting the pole shoe 7 and for reinforcing the portion 5 of the measuring section 4 of the measuring tube 1. Support ribs 9 are, thus, support and reinforcement ribs that are arranged, here, in the shape of a cross on the portion 5. The overlapping area of the support ribs 9 is thereby located below the coil core 6.

Figure 3:
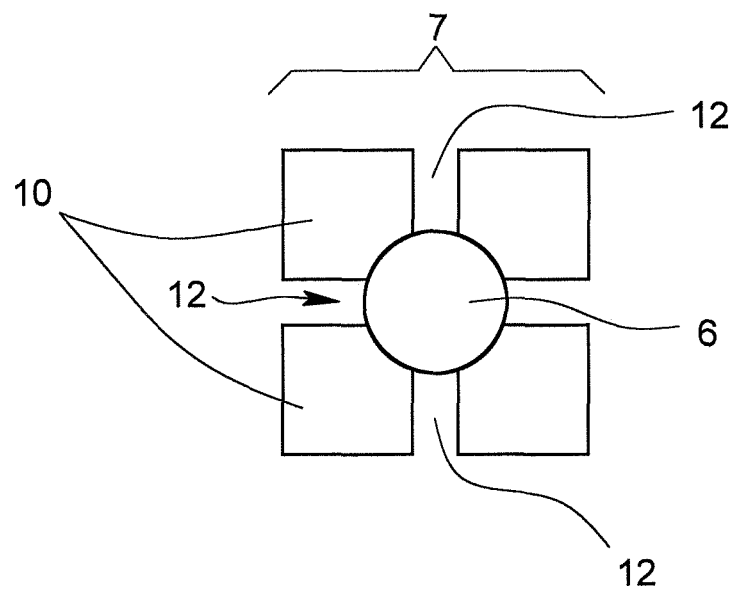
FIG. 3 is a view further illustrating the embodiment of FIG. 2.

In the illustrated embodiment, the pole shoe 7, as seen in FIGS. 2 and 3, is formed of several, in particular four, pole shoe parts 10, which are designed as rectangles, and due to their arrangement relative to the portion 5, create a rectangle that is compatible with the support areas between the support ribs 9.

Thereby, the support ribs 9 allow for the pole shoe parts 10 to be placed flush on the remaining portion 5 due to the arrangement of the pole shoe 7 between the support ribs 9, in that the recesses 12 between the pole shoe parts 10 and the support ribs 9 are compatible with one another.

Furthermore, the pole shoe parts 10 are connected to the end 8 of the coil core 6 facing the portion 5 via pole shoe bridges 11 having good magnetic conductivity. This results in the advantage of a minimum magnetic resistance, so that by a given magnetic flux determined by the magnetic coil (not shown) and the current feed through the coil a relatively strong magnetic field can interfuse the measuring tube 1.

What is claimed is:

1. Magnetic-inductive flowmeter for measuring flow of a flowing medium, comprising:
    a measuring tube,
    a magnetic field generator for generating a magnetic field at least partially interfusing the measuring tube at least one coil core and a pole shoe, and
    at least one measuring electrode for tapping a measuring voltage induced in the flowing medium,
    wherein the measuring tube has a central measuring section that includes the measuring electrodes and which is flat on one side having a planar measuring tube portion,
    wherein a plurality of support ribs are implemented running along the planar measuring tube portion
    wherein the pole shoe is formed of several pole shoe parts, and
    wherein recesses for the support ribs are present between the pole shoe parts, such that the support ribs allow for the pole shoe parts to be placed flush on the remaining portion of the measuring tube portion and the pole shoe parts being supported on the support ribs at the same time.

2. Magnetic-inductive flowmeter according to claim 1, wherein the pole shoe parts are connected to the coil core via pole shoe bridges having good magnetic conductivity.

3. Magnetic-inductive flowmeter according to claim 1, wherein at least one of the coil core, the pole shoe bridges and the pole shoe parts are produced using the MIM (metal injection molding) method.

4. Magnetic-inductive flowmeter according to claim 1, wherein the pole shoe parts are arranged essentially in a plane parallel to the planar measuring tube portion, wherein the coil core is located essentially centrally inside the planar measuring tube portion and wherein an end of the coil core faces the planar measuring tube portion and is arranged above the pole shoe parts.

5. Magnetic-inductive flowmeter according to claim 1, wherein four pole shoe parts are provided.

6. Magnetic-inductive flowmeter according to claim 1, wherein the pole shoe parts have an essentially rectangular outer contour.

7. Magnetic-inductive flowmeter according to claim 1, wherein the support ribs are arranged in the shape of a cross on the planar measuring tube portion.

* * * * *